US006601143B1

(12) United States Patent
Lamparter

(10) Patent No.: US 6,601,143 B1
(45) Date of Patent: Jul. 29, 2003

(54) SELF-ADAPTING CACHE MANAGEMENT METHOD AND SYSTEM

(75) Inventor: Bernd Lamparter, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 09/619,981

(22) Filed: Jul. 20, 2000

(30) Foreign Application Priority Data

Sep. 25, 1999 (EP) .............................................. 99118948

(51) Int. Cl.$^7$ .............................................. G06F 12/12
(52) U.S. Cl. ........................ 711/134; 711/133; 711/135; 711/136
(58) Field of Search ................................ 709/217, 219, 709/216; 711/2, 118, 133, 134, 135, 136, 159, 160

(56) References Cited

U.S. PATENT DOCUMENTS

| 5,043,885 | A | * | 8/1991 | Robinson | 711/133 |
|---|---|---|---|---|---|
| 5,568,632 | A | * | 10/1996 | Nelson | 711/128 |
| 5,701,426 | A | * | 12/1997 | Ryan | 711/133 |
| 5,892,937 | A | * | 4/1999 | Caccavale | 711/135 |
| 5,924,116 | A | * | 7/1999 | Aggarwal et al. | 709/204 |
| 5,943,687 | A | * | 8/1999 | Liedberg | 711/133 |
| 6,032,228 | A | * | 2/2000 | Islam et al. | 707/201 |
| 6,058,456 | A | * | 5/2000 | Arimilli et al. | 711/118 |
| 6,266,742 | B1 | * | 7/2001 | Challenger et al. | 711/133 |

* cited by examiner

*Primary Examiner*—B. James Peikari
(74) *Attorney, Agent, or Firm*—Bracewell & Patterson

(57) ABSTRACT

A self-adapting method and apparatus for determining an efficient cache line replacement algorithm for selecting which objects (or lines) are to be evicted from the cache. Objects are prioritized based upon weights which are determined dynamically for each object. The object weights depend on a first attribute L1 for each cache object and a first control parameter P1 which determines the influence of the first attribute L1 on the weights. The hit rate of the cache memory is observed during a first interval of time while the control parameter is set to a first value. The control parameter is adjusted and the hit rate is observed during a second interval of time. The control parameter is then adjusted an incremental amount having a magnitude and direction determined based on whether the hit rate improved or was reduced. The control parameter may be continuously and automatically adjusted based on observed hit rates and the algorithm may include additional control parameters associated with other object attributes, which are adjusted in a similar manner.

12 Claims, 1 Drawing Sheet

SELF-ADAPTING CACHE MANAGEMENT METHOD AND SYSTEM

BACKGROUND OF THE INVENTION

1. Technical Field

The present invention relates to a method and means for managing a computer system cache and, in particular, to cache replacement algorithms.

2. Description of the Related Art

Caches are typically high speed memories in modern computer systems which temporarily hold portions of the contents of larger slower storage mediums. Integral to the management of cache systems is the replacement algorithm, which selects the portion of the cache contents to be evicted when space is needed for new contents. Improvements in the management of cache contents, in selecting those portions data to be evicted, can result in significant improvements in overall system performance.

Cache memories are commonly utilized to provide information to processors at a faster speed than that which is available from main memory. With the advent of distributed processing, cache systems are also used to improve the speed of data access to servers in a networked data communications system. An important example is caching by web-proxy. Web-proxies are positioned between the web browser and an originating server. Instead of fetching an object, for example a document, directly from the server, the browser first contacts the proxy. If the proxy has a valid copy of the object in its cache, it sends this copy to the browser. Otherwise, the proxy contacts the originating server directly to get a copy of the requested object. Then, the proxy sends this copy to the browser and if the document is cacheable, it stores the document in its cache. If an object is fetched from the cache, this is called a "hit", otherwise it is called a "miss" requiring a "fetch" to load that object from the server in to the proxy's cache.

A cache is typically full during normal operation, and a cache miss requires not only a fetch but also a replacement where one or more other objects must be removed or evicted from the cache and the fetched object is loaded into cache. Prior art replacement methods include usage-based methods which take into account the history of every object's use when determining which objects to evict. Examples of this type of replacement method are the "least recently used" (LRU) approach and the "working set" approach. Non-usage-based approaches select objects for eviction on some basis other than usage. The "first-in-first-out" (FIFO) approach and the "random" approach are examples of this class.

Similar methods are utilized for cache systems exploited for use in a web-proxy. When the cache is full, the proxy has to remove old objects, also called documents, in order to free space for newer documents. Within this art, cache replacement methods are also called garbage collection. Web-proxies typically store a vast amount of documents and it is not possible to store and manage a data structure while keeping the documents sorted according to the probability of a future access. For this reason garbage collection may be performed either at a certain time of the day or as triggered whenever the cache size exceeds a given limit. For determining which documents are to be evicted, a weight is assigned to each document in the cache and documents are selected for eviction based on their weight in relation to the weight assigned to the other documents. The weight is an estimation of the relative significance of a particular object. In other words, the weight estimates the relative probability and number of instances that a particular document will be accessed in the future, as compared to other documents stored in cache.

The fundamental goal of garbage collection is to keep documents which have a high probability of being accessed often in the future and to remove documents that are least likely to be accessed. The accuracy of the assigned weights, as a relative measure of the probability that an object or document will be accessed often in the future, is essential to effective garbage collection. Small improvements in a method for determining such weights can result in significant improvements in the overall hit-rate of the cache memory, and significant improvements in the overall performance of the networked data communications system.

SUMMARY OF THE INVENTION

It is a purpose of the method and system of the present invention to provide a self-adapting algorithm for selecting objects to be evicted from a cache where the algorithm is adjusted based on actual performance.

It is another purpose of the invention for the algorithm to be automatically and continuously adjusted to adapt to varying cache usage patterns.

The forgoing purposes are achieved using the following method. A cache is provided that is adapted to store objects which can be selectively evicted to make space for new objects. An algorithm is provided for determining a weight to be associated with each object stored in the cache. The weights are determined based on a first attribute of the objects and an associated first control parameter, which determines the significance of the first attribute to the overall object weights. The weights are then used to select the objects to be evicted from the cache. The first control parameter is set to an initial value. The hit rate is observed during a first time interval. The first control parameter is then adjusted in a first direction by a first incremental amount. The hit rate is then observed during a second time interval. The first control parameter is then adjusted by a second incremental amount, based on the hit rate during the first time interval and the second time interval.

Optionally, when the hit rate is improved during the second time interval, the direction of the second incremental adjustment is in the same direction as the first incremental adjustment. Otherwise, when the hit rate is not improved during the second time interval, the direction of the second incremental adjustment is in the opposite direction as that of the first incremental adjustment.

In accordance with another embodiment of the present invention, when the hit rate is improved during the second interval, the magnitude of the second incremental adjustment is chosen to be larger than when the hit rate is reduced in the second interval.

Yet another embodiment provides that when the hit rate is improved during the second interval, the magnitude of the second incremental adjustment is larger then the first incremental adjustment. Additionally, when the hit rate is reduced in the second interval, the magnitude of the second incremental adjustment is less than the magnitude of the first incremental adjustment.

The method of the present invention may also include an algorithm for determining weights that is based on a plurality of different attributes of the cache objects where each attribute has a corresponding control parameter which determines the relative significant of each attribute in determining object weights. The value of each control parameter is determined by repeatedly adjusting one parameter at a time and observing the effects of those adjustments on the actual hit rate, and then setting the parameter accordingly to maximize the hit rate. Optionally, more then one parameter may be adjusted at the same time.

In one embodiment, the object attributes considered by the weight algorithm may be the size of each object and the time since the object was last used.

The method of the present invention for adjusting control parameters and observing the hit rate include repeating the control parameter adjustments and hit rate observation steps continuously, using time intervals from several hours to several days.

A preferred embodiment of a system utilizing the methods of the present invention is a web-proxy. Other embodiment of the present invention include computer systems and data processing systems as well as computer readable medium having a computer program for causing a computer to perform any one of the described methods of the present invention.

The purposes, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
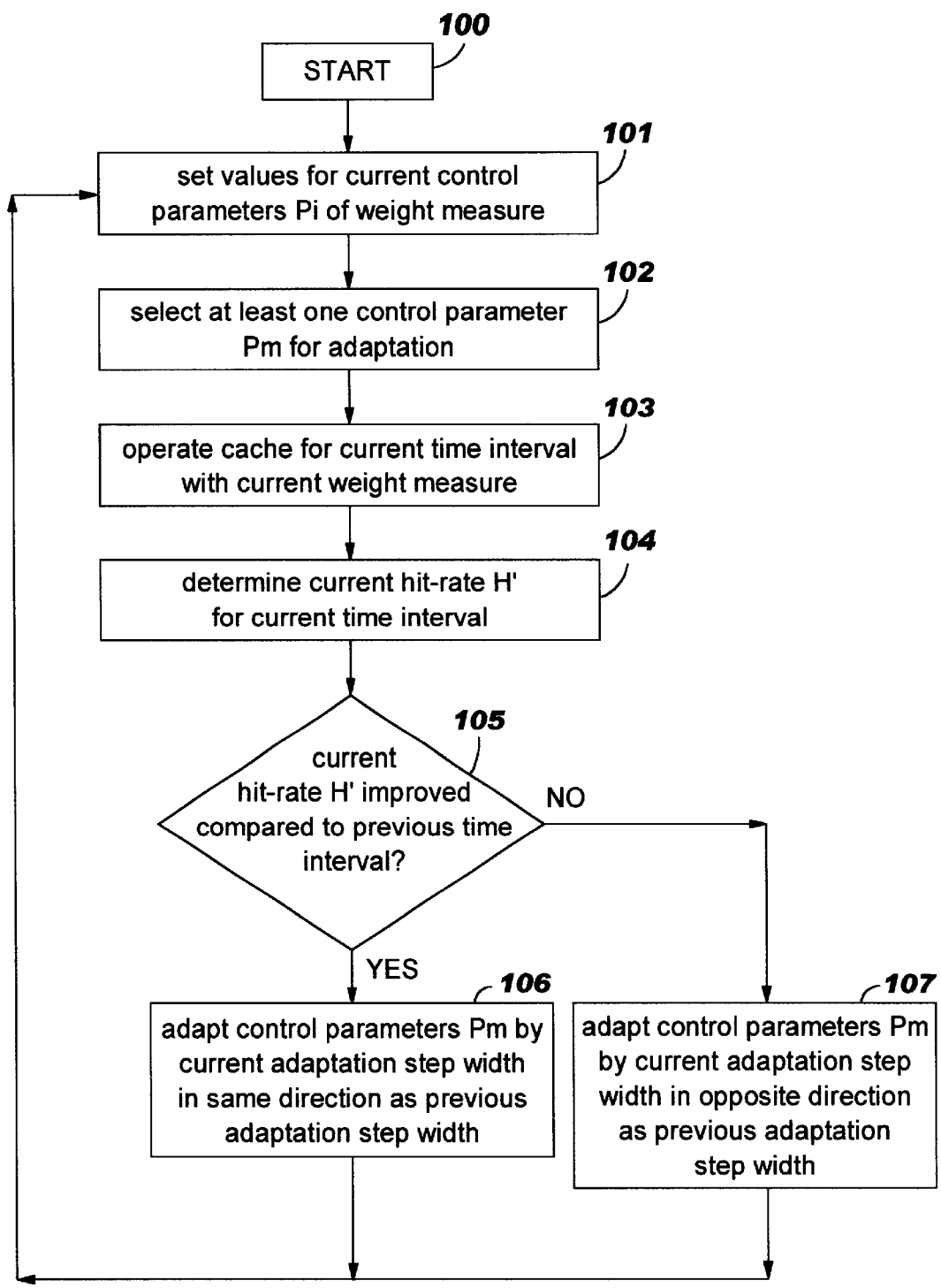
FIG. 1 depicts an illustrative embodiment of a flow chart in which the method of the present invention is advantageously utilized.

The present invention can be implemented in hardware, software, or in a combination of hardware and software. Any computer system or other apparatus adapted for carrying out the methods described herein is suitable. A typical combination of hardware and software for carrying out the methods of the present invention could be a general purpose computer system with a computer program that, when loaded and executed, controls the computer system such that it carries out the methods described herein. The present invention can also be embedded in a computer program stored on a computer readable storage media, which comprises all the features enabling the implementation of the methods described herein, and which—when loaded in a computer system—is able to carry out these methods.

The phrase "computer program" means or "computer program" in the present context includes any expression, in any language, code or notation; or, of a set of instructions intended to cause a system having an information processing capability to perform a particular function either directly or after either or both of the following a) conversion to another language, code or notation; b) reproduction in a different material form.

A preferred embodiment of the present invention is disclosed which is based upon a cache system utilized for a web-proxy. This is not to be understood as a limitation, as the proposed cache replacement technique may be utilized in any other cache management system.

The specification uses the terms "object" or "document" to refer to entities of data the cache replacement management operates upon and which are treated as a unit for decisions related to cache replacement. Other terms equivalent to "object" used in this context include "line(s)", and "block".

The methods of the present invention can improve the hit rate of a cache memory. Embodiments utilizing garbage collection provide an algorithm for determining the weight of each object, where the weight is an estimation of the significant of a particular object, or, in other words, the weight is an estimate of the relative probability and number of instances that a particular document will be accessed in the future, as compared to other documents stored in cache. Based on the weights calculated for the cache objects, cache management selects which objects stored in the cache memory are to be evicted to provide available cache memory space for reuse.

Attributes of cache objects, which are commonly used to determine weights include:

$L_a$—time since last access of an object/document $L_c$—time since first access of an object/document $L_e$—time till the object/document expires S—size of the object/document One approach for determining the weight of each document is to base it on the time since the document was last accessed $L_a$ (LU—Last Recently Used). Then the algorithm for the weight W is:

$$W_{LU}=1/L_a$$

With this method all documents are sorted according to the time since last access and the oldest is removed.

A more sophisticated algorithm for determining each object weight W is:

$$W=(1+1n(s))/L_a$$

In this algorithm the size S of each cache object is considered, in addition to the time since the object was last accessed. Larger documents will stay longer in the cache, based on the assumption that this will increase the hit rate, where the hit rate is calculated in terms of bytes.

An important disadvantage of these approaches is that one has to decide on a single algorithm for calculating the weights (typically the algorithm is hard-coded into the proxy), which cannot be changed. Even where certain adjustable parameters are furnished by an administrator, it is difficult to find "reasonable" values for these parameters to achieve an improved cache hit rate. Even worse, it may be impossible to determine a single set of "reasonable" parameter values where the external conditions are changing continuously.

The method of the present invention solves these problems by proving a self-adapting algorithm for determining the weights, which may be continuously and automatically improved, for an increased cache hit rate, during normal operation of the web-proxy, such that the weights adapt to variations in usage. The method of the present invention is independent of the particular algorithm used for calculating the weights. The present invention assumes only that the weight is dependent upon one or more attributes of the objects Li and a corresponding control parameter Pi, which determines the influence of the object attribute Li on determining the weights. Examples of the object attributes Li include the time since last access $L_a$, the time since first access $L_c$ of a cache object, the time till the object/document expires $L_e$, and the size S of the object. The hit rate is the number of accesses which are satisfied from the cache versus all accesses during a certain time interval. The hit rate may be measured either in the number of requests or in the number of bytes in the request. A mixture of both, or some other abstract measure may be used for the hit-rate to measure the cache's efficiency in serving a requester directly from the cache memory, rather than from slower storage. The abstract notion of a hit-rate allows a comparison of the cache efficiency resulting from different values of the control parameters.

Although the method of the present invention is not dependent on a specific algorithm for calculating the weights, the following algorithm for determining weights proves to be beneficial:

$$W=(A+P1 \cdot 1n(S)/(B+P2 \cdot La$$

Where $L_a$ is the time since last access, S is the size of the object, and A and B are general parameters. This specific example of a weight measure might be kept in mind for a better understanding of how the control parameters Pi control the influence of the features Li on the weight, as referred to in the following description.

Typically, the values for the control parameters Pi which determine the influence of corresponding object attributes Li on the weight are chosen in a way that improves the hit rate. The control parameters are continuously adjusted as the workload of a web-proxy (the cache system) changes.

A method of the present invention for self-adapting the weight as a measure of assumed significance of a cache objects is shown in FIG. 1. The process is as follows:

1. Step 100—The process begins.
2. Step 101—Choose values for the current control parameters Pi which determine the weight measure of cache objects. Start with an assigned initial value for the previous incremental adjustment Di and the previous hit rate H (for example H=0.)
3. Step 102—Select at least one control parameter Pm for adjustment, which determines the influence of corresponding attribute Lm on the weights.
4. Step 103—Operate the caching web-proxy for a specified time interval. In a web-proxy embodiment, time intervals in the range of from several hours up to a day have been determined to be beneficial.
5. Step 104—Observe the web-proxy and calculate the current hit rate H' for this time period.
6. Adjust the selected control parameter Pm.
    6.1 Step 106—If the current hit rate H' has been improved compared to the previous hit rate H during of a previous time interval, then adjust the current value of said first control parameter P1 by an incremental adjustment amount Di' in the same direction than Di in the previous adjustment step.
    6.2 Step 108—If the current hit rate H has been reduced, compared to a previous hit rate H during a previous time interval, then adjust the current value of said first control parameter Pm by an incremental adjustment amount Di' (optionally different than that of step 5.1) in the opposite direction from said previous adaptation step width Di.
7. Step 108—Repeat starting at Step 3, with Di=Di' and H=H'.

The method of the present invention is applicable to a wide range of optimization approaches. A more detailed approach of the current invention in adapting N control parameters Pi, which was efficient and successful, is the following embodiment:

1. Choose initial values for the N control parameters Pi which determine the weight measure of each cache object. Start with an assigned initial value for the previous incremental adjustment, Di and the previous hit rate H (for example H=0.) Select the index m=1.
2. Select the control parameter Pm for adjustment which determines the influence of the corresponding object feature Lm on the weights.
3. Operate the caching web-proxy for a specified time interval (for example one day).
4. Observe the web-proxy and calculate the current hit rate H' for this time interval.
5. Adjust the selected control parameter Pm by an incremental amount Di'.
    5.1 If the current hit rate H' has been improved, compared to the previous hit-rate H of a previous time interval,(i.e. H'>H), then adjust Pm: Pm'=Pm+ $C_+$*Di; $C_+$=1.2; where the increased step width Di'= $C_+$*Di.
    5.2 Otherwise, if the current hit-rate H' has been reduced, compared to the previous hit-rate H of a previous time interval, then adjust the influence of the object feature Lm on the weight by adjusting the control parameter: Pm'=Pm+$C_-$*Di; $C_-$=−0.5. Such that the decreased step width Di'=$C_-$*Di, is now pointing in the opposite direction compared to the previous adaptation step width.
    5.3. Select the next index m=(m+1) mod N
6. Repeat starting at 2, with Di=Di' and H=H'.

In this embodiment, one control parameter is adjusted in each time interval and the control parameters are adjusted in increasingly larger increments, as long as the hit rate also increases. When the hit rate begins to decrease, the size of the adjustment is adjusted to half that of the previous adjustment step width and the direction of the adjustment switches. Additionally, because of the "modulo N" incrementation, another control parameter is then selected for adjustment during each time period.

Optionally, the control parameters may be adjusted at a faster rate, where the intervals of time are several hours up to a day. However, a hit-rate commonly changes during the day due to workload variations, which depend upon the time of the day. Accordingly, an hourly optimization without any adjustment would typically, not be effective.

Another embodiment, utilizing a method of the present invention, is for managing a cache in a web-proxy, where one parameter is adjusted each day. Each parameter is adjusted, in increasingly larger incremental amounts, until the hit rate is no longer improved. Then the amount of the adjustment step width for this control parameter is halved and the sign is switched. The next day another control parameter will be adapted. Alternatively, the control parameters may be selected for adjustment according to a pre-defined schedule.

As already indicated, it would also be possible to adjust the control parameters with a higher frequency, for example every hour. A problem with this approach is that hours with lower access rates typically also have lower hit rates. It is therefore suggested that the hit rate be normalized for comparisons. It has been observed that the hit rate grows linearly with the logarithm of the access rate. It is therefore suggested to normalize the measured hit-rate H as:

$$Hn=H+f \cdot 1n(R/Rm)$$

Where H is the observed hit rate, Hn is the normalized hit rate, f is a factor, R is the access rate in the corresponding time interval, Rm is the medium access rate over multiple time intervals. The factor f may be calculated by the web-proxy at the beginning and also may be adjusted regularly. This normalized hit rate, is an example of a more abstract notion of a hit rate as mentioned above.

An important advantage of the present invention is the improved achievable hit rate of a cache memory. The fact that the method is self-adapting makes the proposed technique especially beneficial in environments with varying usage patterns. Moreover the method is highly flexible and can be combined with other prior art approaches for determining the sizes of the adjustment steps or the sequence of control parameters to adjust.

Choosing the size of the incremental adjustment in step 5.1 (106) to be larger then the incremental adjustment, in step 5.2, (107), results in an adaptation behavior, which is very fast, with respect to directions leading to improvements of the hit rate. The adaptation in other directions is slower. This behavior efficiently compensates for statistical variations of the usage pattern of a cache system.

The approach of repeatedly adapting a first control parameter P1 as long as this adaptation results in an improvement of the hit rate and then switching over to adapting a second control parameter P2 after an adjustment step which resulted in a reduction in the hit rate also accomplishes a very fast and efficient adaptation behavior.

Applying the proposed method to adjust object weights based on the size of each cache object and the time since last access to the cache object further improves the hit rate.

If the current invention is utilized for the cache of a web-proxy, best results have been achieved where the time interval for repeating the self-adapting method is in the range of several hours up to a day. This setting prevents an "over responsive" adaptation behavior and at the same time compensates for variations in usage that depend on the time of the day.

While the invention has been particularly shown and described with reference to a preferred embodiment, it will be understood by those skilled in the art that various changes in form and detail may be made therein without departing from the spirit and scope of the invention.

What is claimed is:

1. A self-adapting method for managing a cache, comprising the steps of:
   providing a cache adapted to store a plurality of objects and which has an observable hit rate;
   identifying a first attribute which is determinable for each of said plurality of objects;
   associating a first control parameter with said first attribute;
   determining a weight for each of said plurality of objects, wherein said weights are used to select one or more of said plurality of objects to be evicted from said cache, and wherein said first control parameter determines the significance of said first attribute in determining each said weight for each of said plurality of objects;
   assigning an initial value for said first control parameter;
   observing the hit rate during a first time interval;
   adjusting said first control parameter in a first direction by a first incremental amount;
   observing the hit rate during a second time interval; and
   adjusting said first control parameter by a second incremental amount, wherein said second incremental amount has a magnitude and a direction determined, at least in part, by said hit rate for said first time interval and said hit rate for said second time interval.

2. A self-adapting method according to claim 1, further comprising the step of:
   evaluating whether said hit rate in said second time interval is improved over said hit rate in said first time interval; and
   wherein said step of adjusting said first control parameter by a second incremental amount includes the step of determining said second incremental amount as follows:
   (1) if said hit rate in said second time interval is improved over said hit rate in said first time interval, then said direction of said second incremental amount is the same as said first direction, and
   (2) if said hit rate during said second time interval is reduced from said hit rate during said first time interval, then said direction of second incremental amount is the opposite of said first direction.

3. A self-adapting method according to claim 2, wherein said step of adjusting said first control parameter by a second incremental amount includes the step of determining said second incremental amount as follows:
   (1) if said hit rate in said second time interval is improved over said hit rate in said first time interval, said magnitude of said second incremental amount is a first value, and
   (2) if said hit rate during said second time interval is reduced from said hit rate during said first time interval, said magnitude of said second incremental amount is a second value which is larger than said second value.

4. A self-adapting method according to claim 2, wherein said step of adjusting said first control parameter by a second incremental amount, includes the step of determining said second incremental amount as follows:
   (1) if said hit rate in said second time interval is improved over said hit rate in said first time interval, the magnitude of said second incremental amount is greater then the magnitude of said first incremental amount, and
   (2) if said hit rate during said second time interval is reduced from said hit rate during said first time interval, said magnitude of said second incremental amount is less then said magnitude of said first incremental amount.

5. A self-adapting method according to claim 1, further comprising the steps of:
   identifying a second attribute which is determinable for each of said plurality of objects;
   associating a second control parameter with each said second attribute, said second control parameter for determining the significance of each said second attribute in determining each said weight for each of said plurality of objects;
   assigning an initial value for said second control parameter;
   observing the hit rate during a third time interval;
   adjusting said second control parameter in a second direction by a third incremental amount;
   observing the hit rate during a forth time interval; and
   adjusting said second control parameter by a forth incremental amount, wherein said forth incremental amount has a magnitude and a direction determined, at least in part, on said hit rate for said third time interval and said hit rate for said forth time interval.

6. A self-adapting method according to claim 5, wherein said step of identifying said first attribute includes the step of identifying said first attribute of each said object as the size of said object; and wherein said step of identifying said second attribute further includes the step of identifying said second attribute as the time since said object has been last accessed.

7. A self-adapting method according to claim 5, wherein said step of determining a weight for each of said plurality of objects further comprises the step of:

evaluating for each of said plurality of objects, a weight, wherein each said weight is determined according to the equation $$weight=(A+P1*\ln(L1))/(B+P2*L2),$$

wherein A and B are general constants, P1 is said first selectable control parameter, P2 is said second control parameter, L1 is said first attribute, and L2 is said second attribute.

8. A self-adapting method according to claim 7, wherein for each of said steps of observing said hit rate during said first, said second, and said third time intervals, each said first, said second, and said third time intervals are each within the range of two or more hours up to several days.

9. A self-adapting method according to claim 1, wherein, only if said hit rate during any said second time interval is improved from said hit rate during the preceding time interval, said method further comprises the steps of:

observing the hit rate during the next time interval; and adjusting said first control parameter in said first direction by a calculated incremental amount; and repeating said steps of observing the hit rate during the next time interval and adjusting said second control parameter, until said next hit rate is no longer improved over the preceding hit rate.

10. A self-adapting method according to claim 9, further comprising the steps of:

identifying a second attribute which is determinable for each of said plurality of objects;

associating a second control parameter with said second attribute, wherein said second control parameter determines the significance of said second attribute in determining each said weight for each of said plurality of objects;

selecting an initial value for said second control parameter;

observing the hit rate during a third time interval; and adjusting said second control parameter by a third incremental amount, wherein said third incremental amounts has a magnitude and a direction determined in part on said hit rate for the preceding time interval and said hit rate for said third time interval.

11. A computer system comprising:

a cache adapted to store a plurality of objects, and which has an observable hit rate;

a plurality of weights, one of said plurality of weights being determined for each of said plurality of objects, using in selecting one or more said objects to be evicted from said cache;

a first attribute and an associated first control parameter, wherein said first control parameter determines the significance of said first attribute in determining each said weight; and a cache control means, withing said cache, adapted to adjust said first control parameter an incremental amount having a magnitude and direction determined, at least in part, on the hit rate for a first time interval while said first control parameter has a first value and the hit rate for a second time interval while said first control parameter has a second value, said first value being different from said second value.

12. The computer system of claim 11, wherein said system is used as a web-proxy.

* * * * *